(12) United States Patent
Watanabe et al.

(10) Patent No.: US 6,568,030 B1
(45) Date of Patent: May 27, 2003

(54) CASTER

(75) Inventors: Yasukuni Watanabe, Tokyo (JP); Takeharu Shizume, Tokyo (JP)

(73) Assignee: Kayaba Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/647,783

(22) PCT Filed: Jan. 27, 2000

(86) PCT No.: PCT/JP00/00415
§ 371 (c)(1),
(2), (4) Date: Oct. 5, 2000

(87) PCT Pub. No.: WO00/46046
PCT Pub. Date: Aug. 10, 2000

(30) Foreign Application Priority Data

Feb. 8, 1999 (JP) ............................................ 11-030305
Sep. 21, 1999 (JP) ............................................ 11-267171

(51) Int. Cl.[7] ........................ A47B 91/06; B60B 33/00
(52) U.S. Cl. ........................... 16/44; 16/19; 16/35 D
(58) Field of Search ........................ 16/44, 19, 33, 16/32, 35 D; 188/381, 282.8, 322.19, 322.22, 317, 315, 285

(56) References Cited

U.S. PATENT DOCUMENTS

| | | | | |
|---|---|---|---|---|
| 1,899,394 A | * | 2/1933 | Noelting et al. | 16/19 |
| 2,834,608 A | * | 5/1958 | Noelting et al. | 16/19 |
| 2,920,890 A | * | 1/1960 | Nawara | 16/19 |
| 3,183,828 A | * | 5/1965 | Clements | 16/19 |
| 4,312,096 A | * | 1/1982 | Schubert et al. | 16/44 |
| 4,485,521 A | * | 12/1984 | Welsch et al. | 16/44 |
| 4,559,669 A | * | 12/1985 | Bonzer et al. | 16/44 |
| 4,685,174 A | * | 8/1987 | Hager | 16/44 |
| 4,763,910 A | * | 8/1988 | Brandli et al. | 16/44 |
| 5,074,389 A | * | 12/1991 | Slocum | 188/277 |
| 5,144,717 A | * | 9/1992 | Siesholtz et al. | 16/35 D |
| 5,347,680 A | * | 9/1994 | Rippe | 16/44 |
| 5,353,899 A | * | 10/1994 | Ohshima | 188/310 |
| 5,375,294 A | | 12/1994 | Garrett | |
| 5,400,469 A | * | 3/1995 | Simonsen | 16/44 |

FOREIGN PATENT DOCUMENTS

| | | |
|---|---|---|
| DE | 30 31 577 A1 | 8/1980 |
| DE | 83 07 206 U1 | 3/1983 |
| DE | 42 05 150 A1 | 2/1992 |
| DE | 42 09 820 A1 | 3/1992 |
| DE | 94 12 537 U1 | 8/1994 |
| DE | 196 13 605 A1 | 4/1996 |
| DE | 298 01 892 U1 | 2/1998 |
| JP | 55-95868 | 12/1953 |
| JP | 61-241201 | 10/1986 |
| JP | 61-186603 | 11/1986 |
| JP | 62-288739 | 12/1987 |
| JP | 63-30279 | 2/1988 |
| JP | 4-81803 | 7/1992 |
| JP | 4-257702 | 9/1992 |
| JP | 58-21037 | 2/1993 |
| JP | 02000177305 A | * 6/2000 |

* cited by examiner

Primary Examiner—Chuck Y. Mah
(74) Attorney, Agent, or Firm—Rabin & Berdo, P.C.

(57) ABSTRACT

In a caster which supports a wheel by using via a link 3 a bracket 2 to be fitted to a wheelchair or the like, an end of the link 3 is connected with a rotation axis of the bracket 2 via a rubber member 8 which is twisted and deformed resulting from oscillating motion of the link 3, and the link 3 and the bracket 2 are connected by a hydraulic damper 20 which damps the oscillating motion of the link 3, whereby an oscillation or a shock can be absorbed.

10 Claims, 8 Drawing Sheets

CASTER

TECHNICAL FIELD

The present invention relates to an improvement of a caster for a wheelchair or the like, particularly a caster having a shock absorbing mechanism.

BACKGROUND ART

Heretofore, there has been a caster having a shock absorbing mechanism which a link to link a wheel to a body of a wheelchair is connected to the body through a rubber bush and the rubber bush is twisted due to displacement of the wheel resulting from a variation in load, thereby absorbing a shock, or the link is replaced with a hydraulic damper having both the functions of a link and a hydraulic damper.

However, in the case of a rubber bush type, usually a twist of the rubber bush is not enough for the damping of a shock after applied. On the other hand, in the case of a hydraulic damper type, its spring characteristic is constant, so that the hydraulic damper is expanded and contracted due to a load applied. This causes a great variation in position of the wheel or occurrence of a resonance phenomenon depending on how uneven the surface of a road is.

The present invention is made in consideration of the problems described above. An object of the present invention is to provide a caster having a shock absorbing mechanism which can cope with a variation in natural frequency of the body of a wheelchair resulting from a variation in load or can stabilize a posture of the body of a wheelchair.

DISCLOSURE OF THE INVENTION

In order to solve the problems mentioned above, the present invention is made and characterized in that in a caster which supports a wheel via a link by using a bracket to be fitted to a wheelchair or the like, an end of the link is coupled to a rotation axis of the bracket through a rubber member which is twisted and deformed resulting from oscillating motion of the link and also the link and the bracket are connected by a hydraulic damper which damps the oscillating motion of the link, whereby the rubber member to connect the wheel and the bracket is twisted and deformed according to a load of the wheelchair, an inclination of the link is determined, and the oscillating motion of the link resulting from vertical movements of the wheel is damped by the hydraulic damper.

As described above, due to a twisting spring characteristic of the rubber bush and a shock absorbing characteristic of the hydraulic damper, it is possible to absorb and promptly damp a shock applied resulting from an oscillation or a change of the surface of a road while traveling.

Since the aforementioned link is composed of a variable link the length of which varies, even though a load applied to the wheelchair varies, it is always possible to cope with a variation in natural frequency of the wheelchair by changing the length of the link. Therefore, the oscillation of the wheelchair can be suppressed or the posture of the wheelchair can always be maintained constant.

Further, the aforementioned variable link is composed of a support cylinder, a movable shaft which is slidably inserted in the support cylinder, positioning holes provided at the support cylinder and the movable shaft, and positioning pins for adjusting a longitudinal position of the movable shaft.

There are two levers which are connected between the bracket and the link so as to fix the wheel at a predetermined position and one of the levers is equipped, at a side end of a section of connecting both of the levers, with a restraint mechanism having a claw for locking relative positions of these two levers. Therefore, an oscillation of the wheelchair can be suppressed, for example, when a heart massage is given to a sick person on a wheelchair, it can efficiently be carried out.

It is arranged such that a viscous hydraulic operating fluid, for example, silicon oil is filled as a hydraulic operating fluid for the hydraulic damper and a pressure of the silicon oil supports a load to be applied to the bracket. Therefore, the hydraulic damper compresses and also shrinks the silicon oil according to the load applied to the body of the wheelchair, whereby an inclination of the link is determined. If a heavy load is applied to the body, a pressure will make a steep rise due to the compression characteristic of the silicon oil resulting from the shrinkage of the hydraulic damper, whereby a depression of the caster can be suppressed and movements of the link can be secured. If a compression ratio of the silicon oil is changed, a pressure buildup curve of the hydraulic damper will vary and damping characteristics of every kind can be obtained.

Since the silicon oil has a compressibility higher than that of a hydraulic operating fluid used for general hydraulic equipment, it is not necessary to install a gas chamber or the like in the hydraulic damper, whereby the structure can be simplified. Further, the silicon oil has elasticity, and therefore it has a function of supporting a load to be applied to the body of the wheelchair, whereby it is possible to eliminate the rubber bush.

The aforementioned hydraulic damper is composed of a damper tube which is connected with one of the bracket and the link described above, a piston rod which is connected with the other of the bracket and the link, a piston which is connected with the piston rod and partitions the inside of the damper tube into two oil rooms, and a space which is formed between the damper tube and the piston and connects the aforementioned two oil rooms. Therefore, the hydraulic damper is expanded and contracted according to a shock applied from the surface of a road to the wheel and viscous resistance of the silicon oil which passes the space makes a steep rise according to the operating speed, whereby an oscillation of the link is effectively damped.

Since the hydraulic damper fulfills both a spring function of supporting a load applied to the body of the wheelchair and a damper function of damping an oscillation of the link, the number of parts of the caster can be curtailed and thus the caster can be miniaturized.

Since a cylindrical section to be engaged with the piston rod and a discoid section in which the aforementioned space is formed to divide the discoid section from the damper tube are formed at the piston, a size of the piston can easily be changed without modifying a design of the piston rod or the like. By changing the size of the piston and thus changing the cubic volume of the silicon oil to be filled in the hydraulic damper, it is possible to change the damping characteristic of the hydraulic damper.

BEST MODE FOR CARRYING OUT THE INVENTION

Embodiments of the present invention will subsequently be described with reference to the accompanying drawings.

Figure 1:
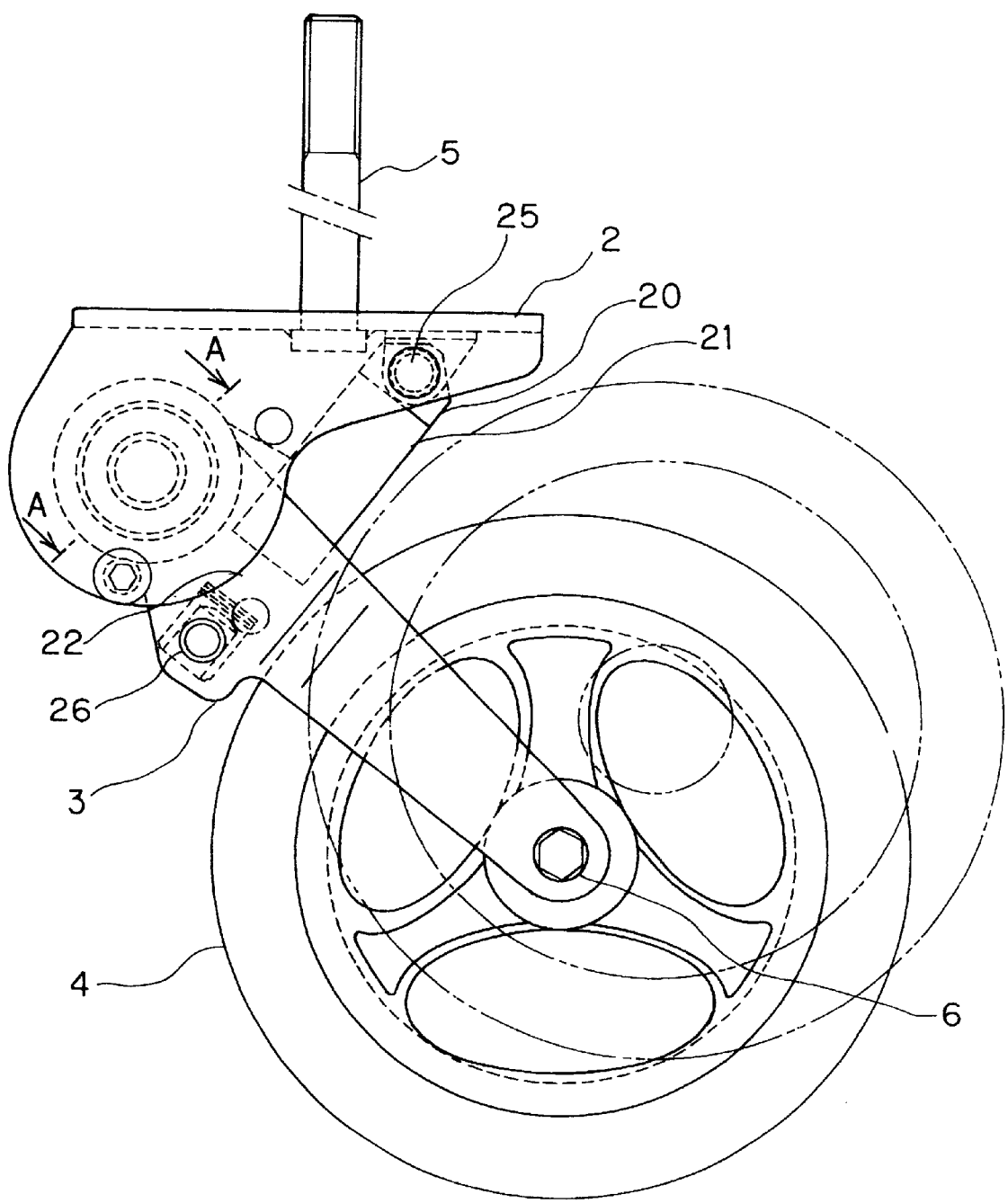
FIG. 1 is a side view showing a first embodiment according to the present invention.

As shown in FIG. 1, a caster is composed of a bracket 2 which is joined to a body of a wheelchair or the like, a link 3 which is rotatably supported by the bracket 2, and a wheel 4 which is rotatably supported by a tip section of the link 3. The wheel 4 is rotatably supported by a bolt 6, which is joined to the tip section of the link 3, via a bearing which is not shown in the drawings.

Figure 2:
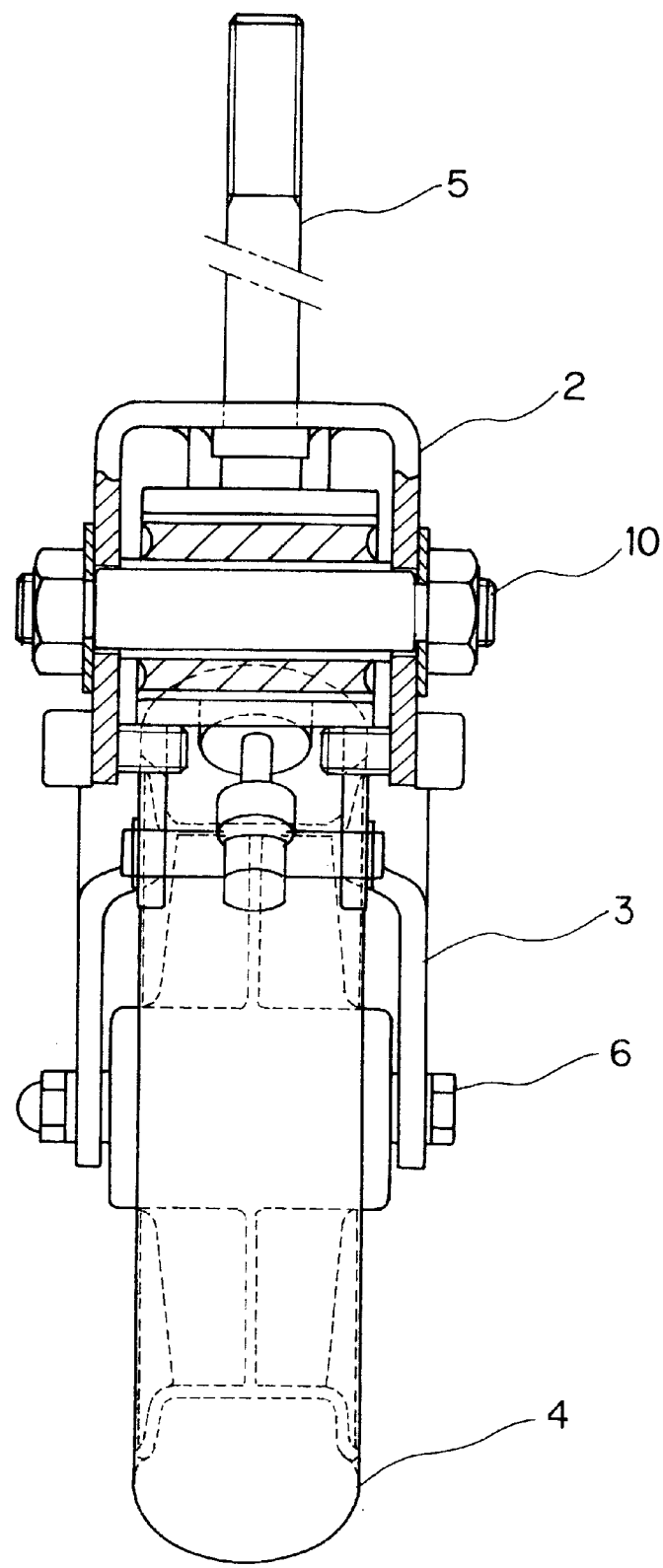
FIG. 2 is a front view showing the first embodiment similarly.

As shown in FIG. 2, the bracket 2 has a U-shaped cross section and is joined to the body of the wheelchair by a bolt 5, which penetrates an upper part of the cross section, via a bearing which is not shown in the drawings. It is arranged such that the bracket 2 rotates around a vertical axis (in a direction of right and left) and the wheel 4 faces toward a traveling direction.

The link 3 is supported by the bracket using a bolt 10 and is rotatable around a horizontal axis (in a vertical direction) when a rubber bush 8 is twisted.

Figure 3:
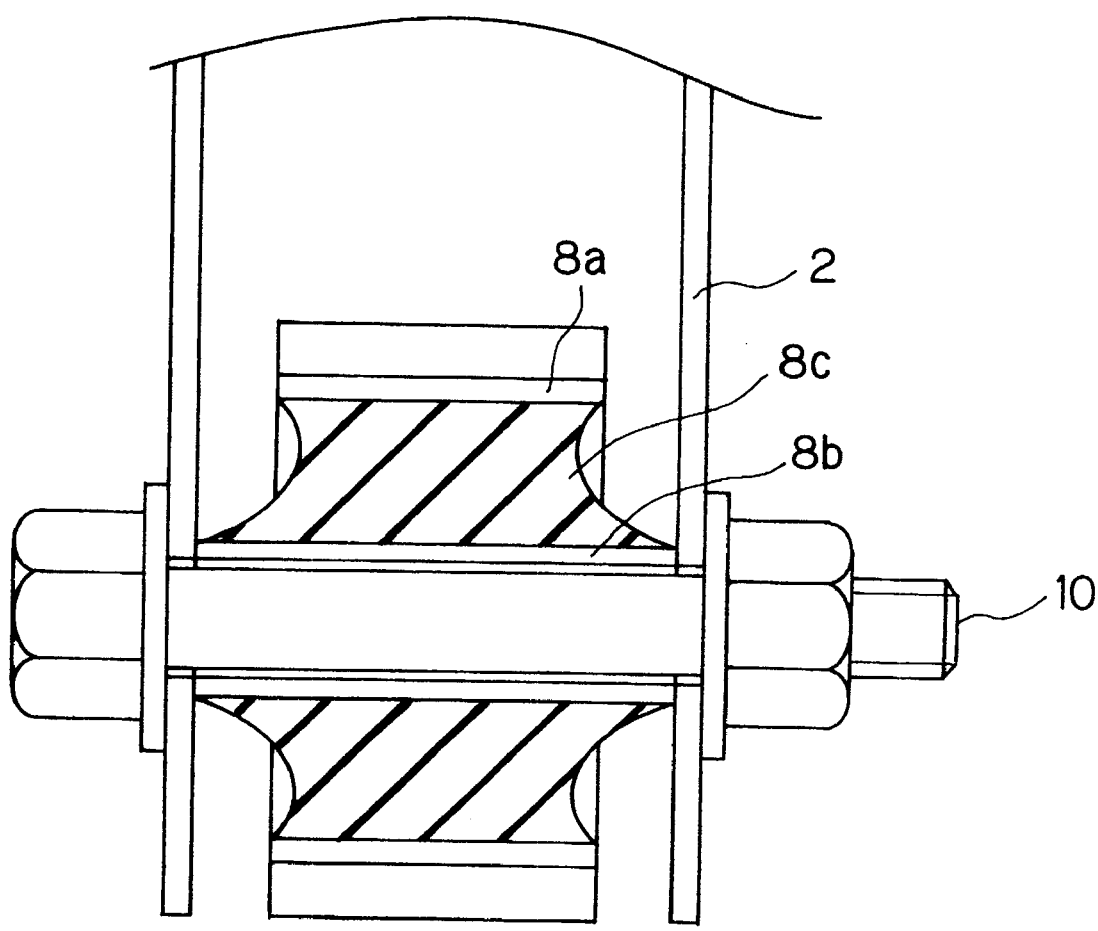
FIG. 3 is a sectional view of a rubber bush taken along line A—A of FIG. 1 similarly.

FIG. 3 shows details of the rubber bush 8 which applies twisting elastic force to the link 3. The rubber bush 8 is composed of an external cylinder 8a, an internal cylinder 8b, and a rubber material 8c which is provided between the external cylinder 8a and the internal cylinder 8b.

For example, the rubber material 8c is adhered by vulcanization to the external cylinder 8a and the internal cylinder 8b, and the internal cylinder 8b which is inserted in a rotation axis of the link 3 is joined to the bracket 2 by the bolt 10.

Due to vertical movements of the wheel 4, the link 3 inclines and the rubber material 8c of the rubber bush 8 is twisted, thereby absorbing a shock resulting from the vertical movements of the wheel 4.

It is arranged such that a single rod type hydraulic damper 20 is provided between the bracket 2 and the link 3 and the hydraulic damper 20 is expanded and contracted resulting from rotations of the link 3.

Figure 4:
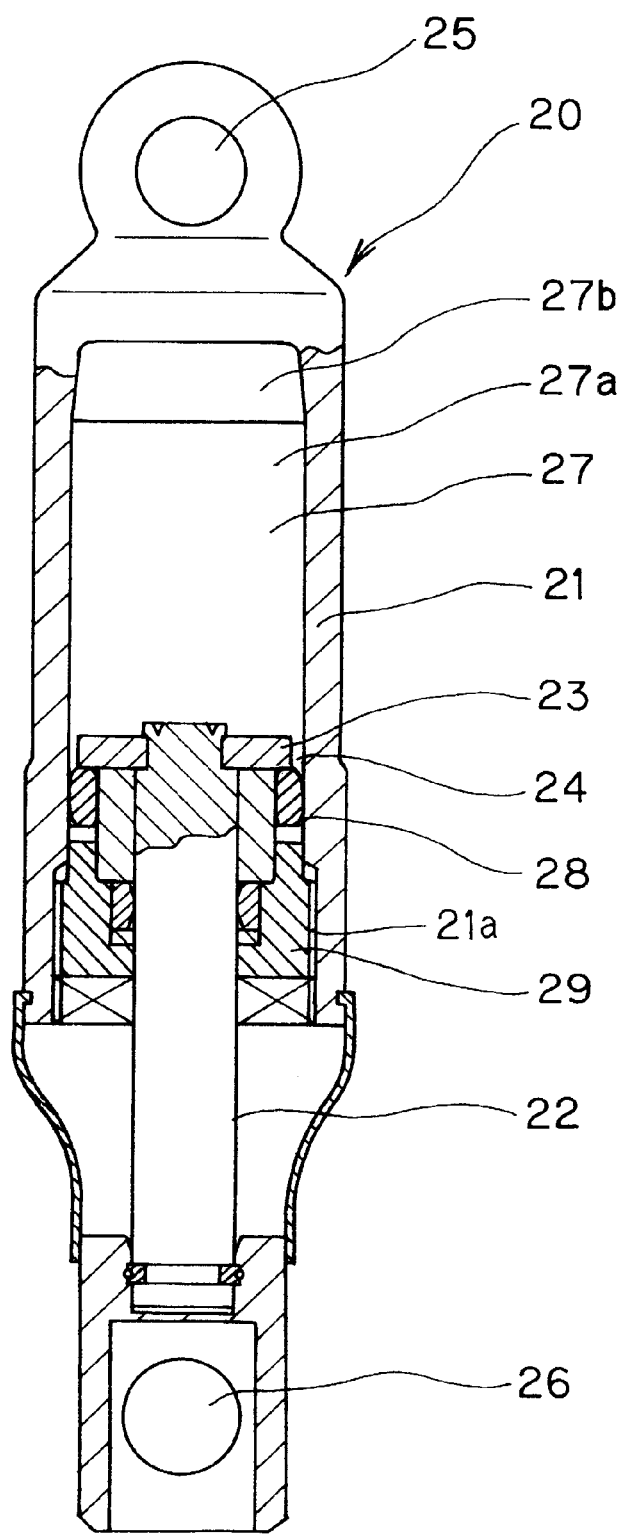
FIG. 4 is a sectional view showing a hydraulic damper similarly.

As shown in FIG. 4, the hydraulic damper 20 is composed of a damper tube 21 which is coupled to the bracket 2 through a pin 25, a piston rod 22 which is coupled to the link 3 through a pin 26 and is engaged with the hydraulic damper 20, and a piston 23 which is connected with the piston rod 22.

A screw section 21a is provided on an opening end inner surface of the damper tube 21, a cylindrical end member 29 is spirally engaged with the screw section 21a, and the piston rod 22 is slidably fitted in the inside of the end member 29. A seal ring is provided between the end member 29 and the piston rod 22 so as to seal up the inside of the damper tube 21.

The piston 23 partitions the inside of the damper tube 21 into two oil rooms 27 and 28, and the oil room 27 is further divided into an oil bank 27a and a gas chamber 27b. An annular space 24 which connects each of the oil rooms 27 and 28 is formed between the damper tube 21 and the piston 23. An outer circumferential surface of piston 23 is entirely not in contact with an inner circumferential surface of the damper tube 21.

Next, a description of operation will be given.

As described above, due to a variation in load which is applied to the body of the wheelchair or the like, for example, a variation in weight of patients who sit on the wheelchair or a variation in unevenness of the surface of a road, the link 3 oscillates around the rotation axis and the rubber bush 8 is twisted.

In such a case, in order to damp oscillating motion of the wheelchair which may occur resulting from an oscillation of the wheel 4 applied while traveling, the rubber bush 8 and the hydraulic damper 20, which is provided between the bracket 2 and the link 3, are expanded and contracted, thereby absorbing an oscillation or a shock resulting from the unevenness of the surface of a road or loading the wheelchair with a substance to be carried.

Incidentally, it can be considered that the respective natural frequencies differ depending on a variation in load to be applied to the wheelchair and therefore the hydraulic damper 20 having only a predetermined elastic characteristic is not enough for stabilizing a damping effect.

The natural frequency "f" of the wheelchair is expressed by the following formula:

$$f = \frac{1}{2\pi}\sqrt{K/M}$$

Here, "K" is a twisting spring constant of the rubber bush 8 and "M" is weight of the wheelchair.

Thus, when the weight of the wheelchair varies, the natural frequency changes, and when a posture of the wheelchair is changed, a twisting angle of the rubber bush 8 also varies.

Figure 5:
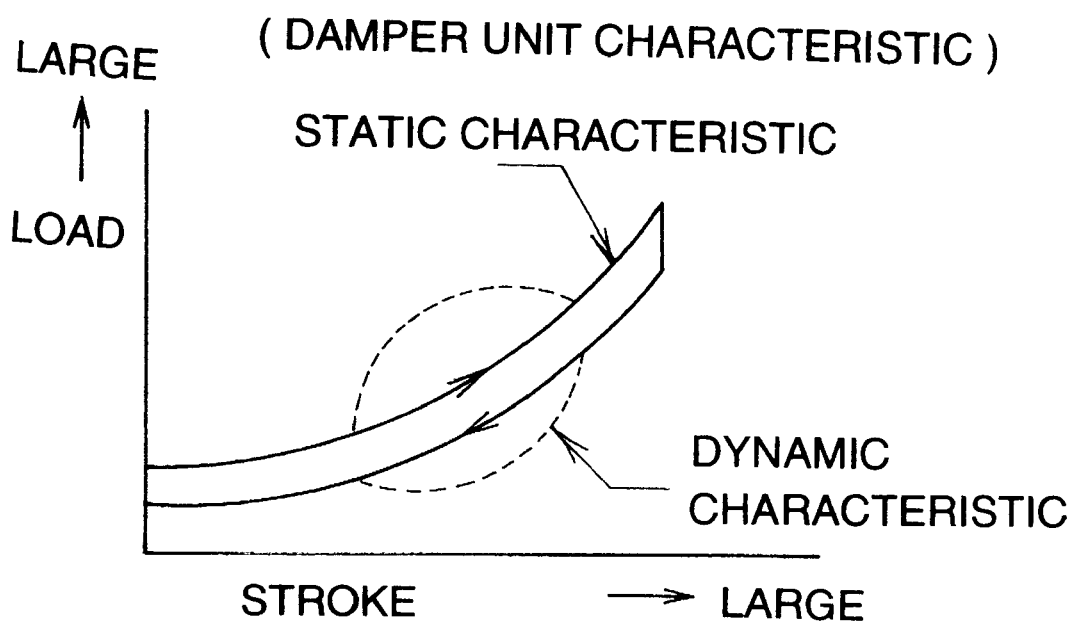
FIG. 5 is a characteristic diagram showing a relationship between a stroke of the hydraulic damper and a load similarly.

This is because generally the twisting spring characteristic of the rubber bush 8 is non-linearity as shown in FIG. 5 and therefore the more weight of the wheelchair 20 increases, the larger the twisting angle becomes, but the smaller a vertical load becomes (the smaller the spring constant K becomes).

Thus, if the characteristic is utilized, even though the weight of the wheelchair varies, the twisting spring characteristic held by the rubber bush 8 will vary according to a change of the weight, and therefore the wheelchair will elastically be supported and the nature frequency will vary, thereby suppressing the resonance phenomenon.

Next, a second embodiment of the present invention in which a viscous hydraulic operating fluid, for example, silicon oil is filled as a hydraulic operating fluid in the damper tube 21 of the hydraulic damper 20 will be described.

Silicon oil is synthetic oil having dimethylpolysiloxane structure, and when received a pressure, a viscosity of the silicon oil rapidly increases and it shows very high compressibility as compared with organic oil. Since the compressibility of the silicon oil is high, it is not necessary to provide a gas chamber or the like in the hydraulic damper 20, whereby the structure can be simplified.

With the shrinkage of the hydraulic damper 20, the silicon oil in the damper tube 21 is compressed by the cubic volume of a portion of the piston rod 22 which is entered into the damper tube 21, whereby a pressure in the damper tube 21 rises. Thus, as shown by a solid line in FIG. 5, a load supported by the hydraulic damper 20 in a stationary state increases according to a stroke (amount of shrinkage) and an increasing rate of the load to the stroke increases according to a compression ratio.

When the hydraulic damper 20 shrinks, the silicon oil which passes the annular space 24 gives shearing resistance and viscous resistance and the load supported by the hydraulic damper 20 becomes larger than a value of the static characteristic. On the other hand, when the hydraulic damper 20 expands, the silicon oil which passes the annular space 24 gives the sharing resistance and viscous resistance and the load supported by the hydraulic damper 20 becomes smaller than a value of the static characteristic.

The constitution is as described above and the hydraulic damper 20 shrinks compressing the silicon oil according to the load applied to the body of the wheelchair, whereby an inclination of the link 3 is determined. If the load applied to the body of the wheelchair is large, a depression of the caster will be suppressed when a pressure of the silicon oil rapidly rises with the shrinkage of the hydraulic damper 20. Thus, movements of the link 3 can be secured.

The hydraulic damper 20 is expanded and contracted according to a shock applied to the wheel 4 from the surface of a road and the viscous resistance of the silicon oil which passes the annular space 24 arises according to the operating speed, whereby an oscillation of the link 3 is efficiently damped.

Thus, since the hydraulic damper 20 carries out both a spring function of supporting the load applied to the body of the wheelchair and a damper function of damping an oscillation of the link 3, the rubber bush can be eliminated, the number of parts of the caster can be curtailed, and the caster can be miniaturized.

According to a third embodiment, as shown in FIG. 4, it is arranged such that the end member 29 is spirally engaged with the screw section 21a installed on an inner surface of the damper tube 21. Therefore, the capacity of the inside of the oil chamber can be changed by advancing or retracting the end member 29, and in the case of the hydraulic damper 20 in which the silicon oil is filled, a compression ratio of the silicon oil can be changed as occasion demands.

Figure 6:
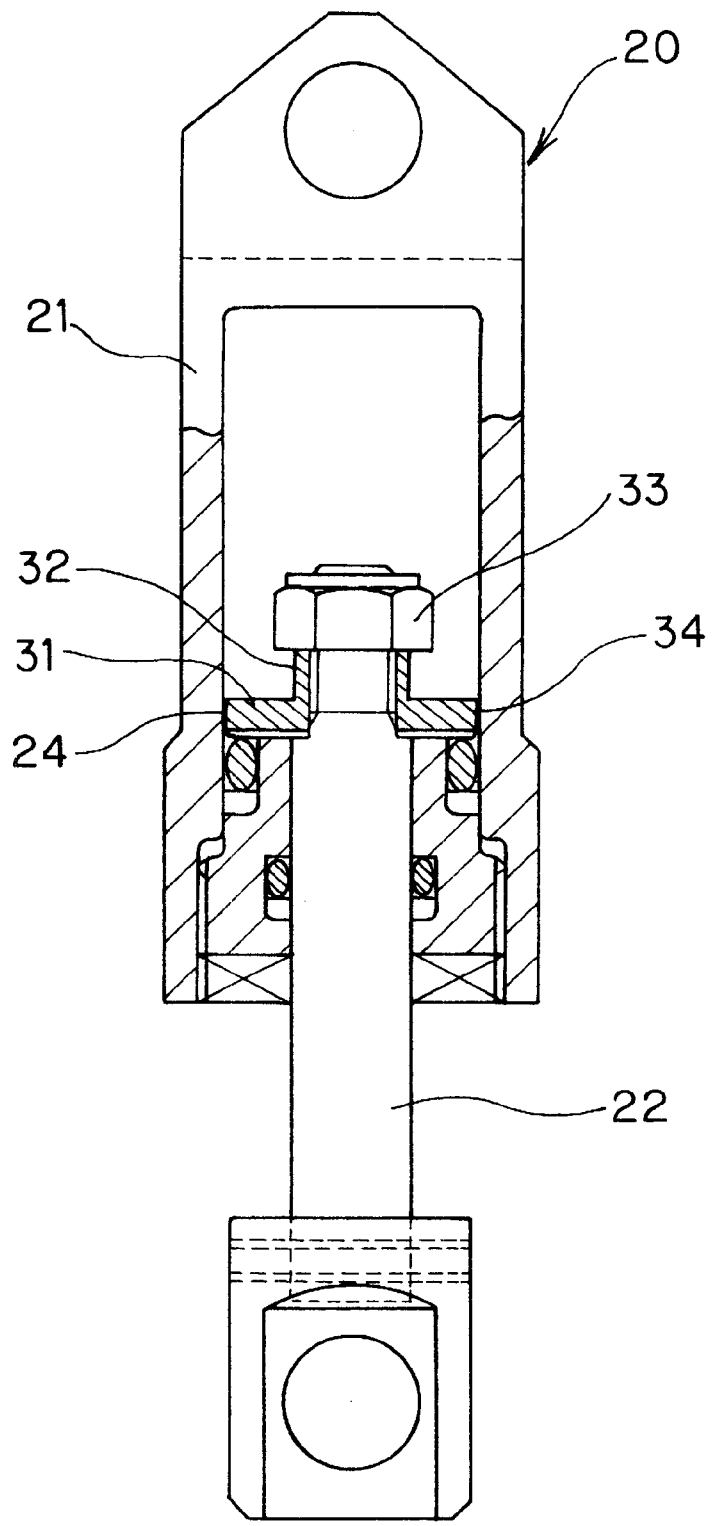
FIG. 6 is a sectional view of a hydraulic damper showing a third embodiment.

Next, a fourth embodiment shown in FIG. 6 will be described. Incidentally, the identical numerals are attached to the components same as those of the embodiments described above.

A piston 34 has a discoid section 31, which faces an inner surface of the damper tube 21 across the annular space 24, and a cylindrical section 32 which is engaged with the piston rod 22 and is joined to the piston rod 22 by means of a nut 33.

In this case, the piston 34 is miniaturized as compared with the piston 23 which is shown in FIG. 4. Cubic volume of the silicon oil filled in the hydraulic damper 20 increases by a decreased portion of the cubic volume of the piston 34 and damping force given by the hydraulic damper 20 increases.

Further, by forming the piston 34 which has a size in an axial direction identical to that of the piston 23 shown in FIG. 4, it is possible to exchange the piston 34 with the piston 23 without modifying the design of the piston rod 22 or the like, whereby the damping characteristic of the hydraulic damper 20 can easily be changed.

Figure 7:
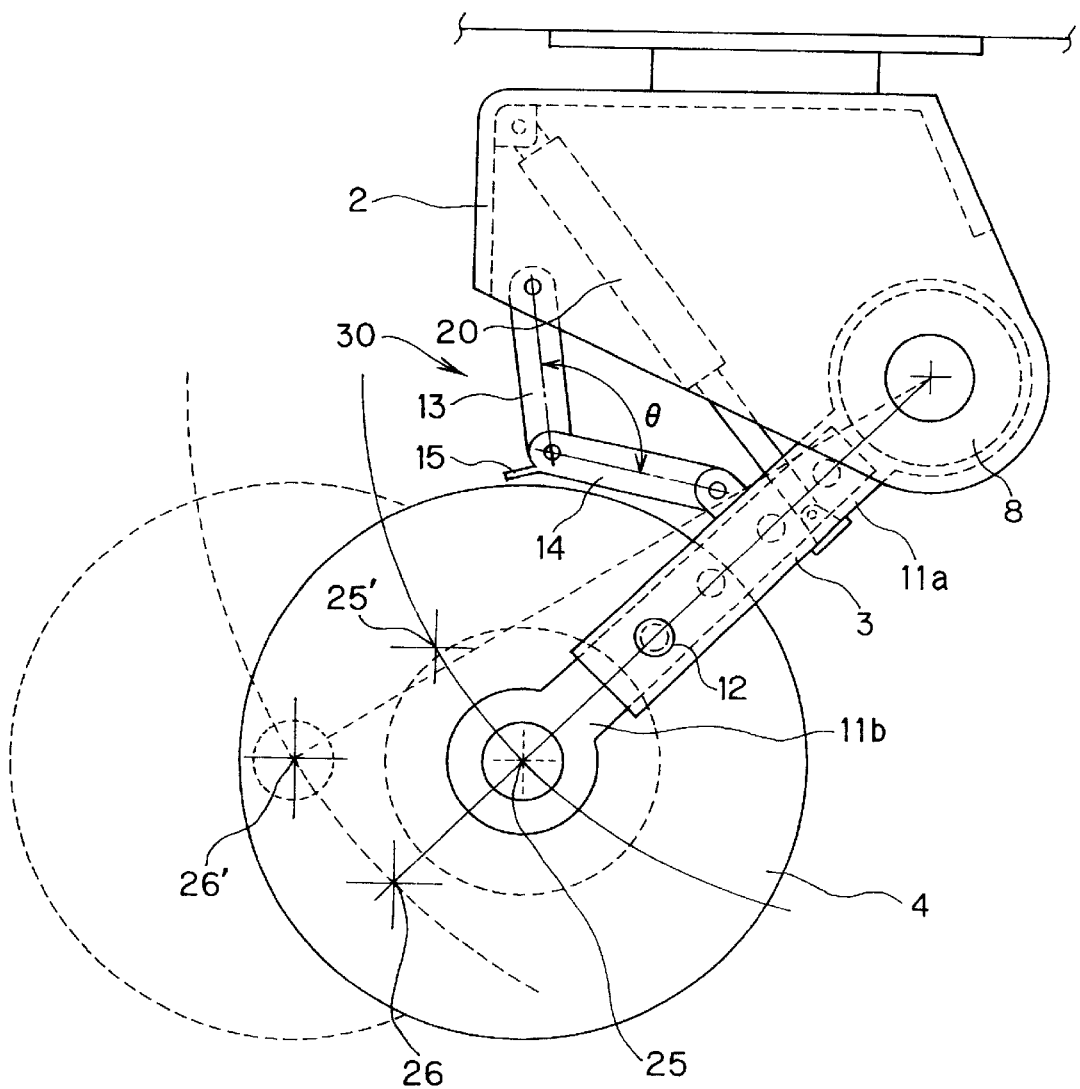
FIG. 7 is a side view showing a fourth embodiment.

A fifth embodiment shown in FIG. 7 is characterized in that length of the link 3 is varied. The link 3 is composed of a supporting cylinder 11a, which is connected around a rotation axis of the bracket 2 via the rubber bush 8, and a movable shaft 11b which is slidably formed along the inside of the supporting cylinder 11a. The length of the link 3 can be adjusted by a positioning pin 12 which penetrates a plurality of positioning holes provided at the supporting cylinder 11a and the movable shaft 11b, respectively. Further, an axle 25 provided at a tip of the movable shaft 11b supports the wheel 4 in such a manner that the wheel 4 can freely rotate.

Further, a lock mechanism 30 which restricts a setting angle of the link 3 to a predetermined angle is provided between the bracket 2 and the link 3. In this embodiment, two levers 13 and 14 which are connected with the bracket 2 and the link 3 form an angle θ, and an upward movement of the wheel is restrained by a claw section 15, which is installed at an end of one of the levers 13 and 14 on the side that the lever is connected with the other lever, for controlling the angle θ.

Thus, the movable shaft 11b enables the supporting cylinder 11a to slide, and the movable shaft 11b and the supporting cylinder 11a are fixed by the positioning pin 12 which penetrates the positioning holes provided at the supporting cylinder 11a and the movable shaft 11b, respectively. Therefore, the length of the link 3 can be varied, whereby a twisting angle of the link 3 varies.

In other words, if conditions of the load are the same, the longer the length of the link 3 is, the softer the twisting spring characteristic of the rubber bush 8 is. On the contrary, the shorter the length of the link 3 is, the harder the twisting spring characteristic of the rubber bush 8 is.

Thus, by changing the length of the link 3, the twisting spring characteristic can be changed, and by combining the twisting spring characteristic of the rubber bush 8 with the length of the link 3, the natural frequency of the wheelchair or the like can be maintained constant more accurately.

On the other hand, a height of the posture of the wheelchair varies according to the change of a load, but it is also possible to stabilize the posture of the wheelchair by adjusting the length of the link 3.

Figure 8:
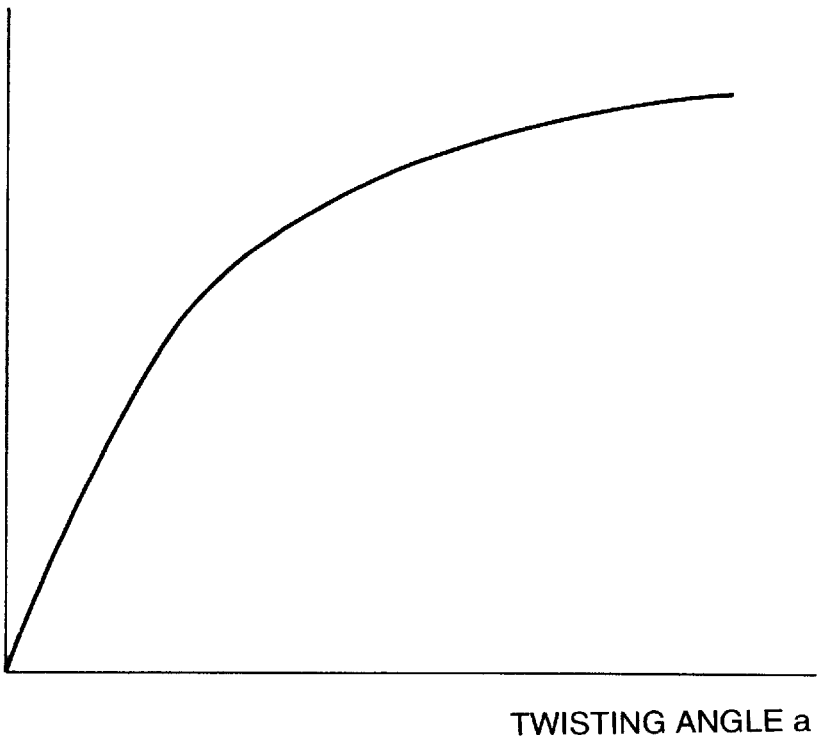
FIG. 8 is a characteristic diagram showing a relationship between twisting torque and twisting angle of a typical rubber bush.

More specifically, as shown in FIG. 8, generally when a load applied to the wheelchair increases, the rubber bush 8 is twisted, whereby the rotation axis of the wheel 4 is displaced to the position of "point 25'." However, by extending the link 3 to the position of "point 26" so as to cope with the change of the load and combining the twisting spring characteristic of the rubber bush 8 with the length of the link 3, it is possible to place the wheel 4 at the position of "point 26'" the vertical direction of which is same as that of the rotation axis.

Thus, by stabilizing the posture of the wheelchair, a location of the center of gravity can be stabilized, a constant stroke amount can be secured, and stabilized traveling and a comfortable ride can be secured.

Further, the lock mechanism 30 is provided between the bracket 2 and the link 3. In ordinary state, the levers 13 and 14 form dogleddged shapes, and the angle θ formed by the two levers 13 and 14 is changed so as to cope with the movement of the wheel 4. Further, in order to fix the wheel 4 at a predetermined position, the angle θ is rendered to be 180 degrees or more, and by making the claw section 15 provided at one lever 14 come into contact with the other lever 13, the angle θ is fixed and the wheel 4 is restricted to the predetermined position. Due to such constitution, the displacement of the wheel 4 can be suppressed and a jolt of the wheelchair can be prevented, for example, when a heart massage is given to a sick person on the wheelchair.

INDUSTRIAL APPLICABILITY

As described above, the caster having a shock absorbing mechanism according to the present invention can absorb an oscillation or a shock resulting from unevenness of the surface of a road or loading of a substance to be carried and therefore it is useful for a wheelchair for the sick or a cart for carrying baggage.

What is claimed is:

1. A caster suitable to be fitted to a wheelchair, comprising:
    a bracket;
    a link having one end pivotally connected to the bracket via a rubber bush that twists and deforms in response to an oscillating motion of the link;
    a wheel rotatably mounted to the other end of the link; and
    a hydraulic damper connected between the link and the bracket to damp the oscillating motion of the link;
    wherein the hydraulic damper comprises a tube having one end connected to the bracket and an other end being open, an end member spirally engaging a screw section provided on an inner surface of the other end of the tube, a piston rod engaged slidably with the end member and having one end connected to the link, and a piston connected to an other end of the piston rod.

2. A caster according to claim 1, wherein the hydraulic damper is filled with a viscous hydraulic operating fluid as a hydraulic operating fluid and a pressure of the viscous hydraulic operating fluid supports a load applied to the bracket.

3. A caster according to claim 2, wherein the viscous hydraulic operating fluid is silicon oil.

4. A caster according to claim 2, wherein the piston partitions an inside of the damper tube into two oil rooms, the configuration of the piston being such that a space is formed between the damper tube and the piston that connects the two oil rooms.

5. A caster according to claim 4, wherein the piston includes a cylindrical section engaged with the piston rod and a discoid section with the space formed between the damper tube and the piston.

6. A caster according to claim 2, wherein a compression ratio of the viscous hydraulic operating fluid can be varied.

7. A caster suitable to be fitted to a wheelchair, comprising:
    a bracket;
    a link having one end pivotally connected to the bracket via a rubber bush that twists and deforms in response to an oscillating motion of the link;
    a wheel rotatably mounted to the other end of the link; and
    a hydraulic damper connected between the link and the bracket to damp the oscillating motion of the link;
    wherein the link can be adjusted in length to vary a distance between a center of the oscillation motion of the link and a center of the rotation of the wheel.

8. A caster according to claim 7, wherein the link comprises:
    a supporting cylinder;
    a movable shaft which is slidably inserted in the supporting cylinder;
    a plurality of positioning holes disposed along the length of the supporting cylinder and the movable shaft; and
    a positioning pin for adjusting a longitudinal position of the movable shaft by insertion in selected ones of the positioning holes.

9. A caster suitable to be fitted to a wheelchair, comprising:
    a bracket;
    a link having one end pivotally connected to the bracket via a rubber bush that twists and deforms in response to an oscillating motion of the link;
    a wheel rotatably mounted to the other end of the link; a hydraulic damper connected between the link and the bracket to damp the oscillating motion of the link; and
    two levers pivotally connected between the bracket and the link, one of the levers being equipped, at an end at which the levers are connected to each other, with a restraint mechanism having a claw section for locking relative positions of the two levers, so as to fix the wheel at a predetermined position.

10. A caster suitable to be fitted to a wheelchair, comprising:
    a bracket;
    a link having one end pivotally connected to the bracket via a rubber bush that twists and deforms in response to an oscillating motion of the link;
    a wheel rotatably mounted to the other end of the link; and
    a hydraulic damper connected between the link and the bracket to damp the oscillating motion of the link;
    wherein the link can be adjusted in length to maintain a height of the bracket above the center of rotation of the wheel when a load applied to the caster changes.

* * * * *